(12) United States Patent
Chartrel et al.

(10) Patent No.: US 10,974,431 B2
(45) Date of Patent: Apr. 13, 2021

(54) CONTINUOUS GLUING PROCESS OF AN ADHESIVE COMPOSITION WITH A GLUING NOZZLE HAVING AN EXTRUSION DIE WITH A RELAXATION VOLUME

(71) Applicant: BOSTIK SA, La Plaine Saint Denis (FR)

(72) Inventors: Jean-Francois Chartrel, Cuts (FR); Christophe Robert, Thourotte (FR); Myriam Grisot-Saule, Compiegne (FR)

(73) Assignee: BOSTIK SA, La Plaine Saint Denis (FR)

( * ) Notice: Subject to any disclaimer, the term of this patent is extended or adjusted under 35 U.S.C. 154(b) by 690 days.

(21) Appl. No.: 14/579,009

(22) Filed: Dec. 22, 2014

(65) Prior Publication Data
US 2015/0174879 A1    Jun. 25, 2015

(30) Foreign Application Priority Data

Dec. 20, 2013  (FR) .................................. 13/63.335

(51) Int. Cl.
*B32B 37/00* (2006.01)
*B29C 48/08* (2019.01)
(Continued)

(52) U.S. Cl.
CPC ............ *B29C 48/08* (2019.02); *B29C 48/022* (2019.02); *B29C 48/267* (2019.02);
(Continued)

(58) Field of Classification Search
CPC . B29C 47/0869; B29C 47/165; B29C 47/124; B29C 47/14; B29C 47/16;
(Continued)

(56) References Cited

U.S. PATENT DOCUMENTS 3,680,997 A * 8/1972 Dukert ................ B29C 47/0816
425/192 R
4,708,629 A * 11/1987 Kasamatsu ......... B29C 47/0021
118/315
(Continued)

FOREIGN PATENT DOCUMENTS

DE   3503721 A1 * 8/1986 ......... B29C 47/0021
EP   0605080 A1 * 7/1994 .......... B05C 5/0262
(Continued)

OTHER PUBLICATIONS

Rodriguez, F., Principles of Polymer Science, Second Edition, 1982, pp. 218-221.*

(Continued)

*Primary Examiner* — James D Sells
(74) *Attorney, Agent, or Firm* — Millen White Zelano and Branigan, PC; John Sopp

(57) ABSTRACT

The invention relates to a gluing process of an adhesive composition with the use of a gluing nozzle having an extrusion die for continuous extrusion of an adhesive composition over a predetermined width, the extrusion die (20) comprising a lower lip (22) and an upper lip (24), the upper and lower lips (24, 22) extending parallel to one another so as to form a transverse channel (28) for the longitudinal flow of the adhesive composition, the transverse channel extending longitudinally between: a supply opening (30) for supplying the adhesive composition; and an extrusion outlet (34) for extrusion of the adhesive composition (34); the channel (28) comprising a concave volume (32) for relaxation of the adhesive composition between the supply opening (30) and the gluing outlet (34).

21 Claims, 4 Drawing Sheets

(51) Int. Cl.
*B29C 48/25* (2019.01)
*B29C 48/00* (2019.01)
*B29C 48/31* (2019.01)
*B32B 37/12* (2006.01)
*B32B 37/15* (2006.01)
*C09J 5/00* (2006.01)
*B29K 75/00* (2006.01)
*B29K 105/00* (2006.01)
*B29C 48/14* (2019.01)
*B29C 48/155* (2019.01)
*B29C 48/255* (2019.01)
*B29C 48/30* (2019.01)

(52) U.S. Cl.
CPC ........ *B29C 48/313* (2019.02); *B32B 37/1284* (2013.01); *B32B 37/153* (2013.01); *C09J 5/00* (2013.01); *B29C 48/0021* (2019.02); *B29C 48/142* (2019.02); *B29C 48/1472* (2019.02); *B29C 48/155* (2019.02); *B29C 48/2556* (2019.02); *B29C 48/3003* (2019.02); *B29C 2791/006* (2013.01); *B29K 2075/00* (2013.01); *B29K 2105/0097* (2013.01); *B29K 2995/0073* (2013.01); *B29K 2995/0081* (2013.01)

(58) Field of Classification Search
CPC . B29C 47/0859; B05C 5/0262; B05C 5/0266; B05C 5/0258
See application file for complete search history.

(56) References Cited

U.S. PATENT DOCUMENTS

| | | | |
|---|---|---|---|
| 5,446,638 A * | 8/1995 | Matsuzaki | F21S 48/32 362/294 |
| 6,843,874 B1 * | 1/2005 | Janssen | B32B 7/12 156/230 |
| 7,092,855 B2 | 8/2006 | Wyatt et al. | |
| 8,105,064 B2 | 1/2012 | Nozawa et al. | |
| 2004/0238995 A1 * | 12/2004 | Ulcej | B29C 47/0021 264/176.1 |
| 2004/0241327 A1 | 12/2004 | Wyatt et al. | |
| 2006/0105072 A1 * | 5/2006 | Hughes | B29C 47/08 425/131.1 |
| 2006/0164740 A1 * | 7/2006 | Sone | G02B 5/30 359/883 |
| 2006/0210666 A1 * | 9/2006 | Ouriev | A21C 11/16 425/376.1 |
| 2009/0035410 A1 | 2/2009 | Nozawa et al. | |
| 2013/0259965 A1 * | 10/2013 | Cloeren | B29C 47/14 425/190 |

FOREIGN PATENT DOCUMENTS

| | | | | |
|---|---|---|---|---|
| GB | 732782 A | * | 6/1955 | ............ B29C 47/14 |
| JP | 5528825 A | | 2/1980 | |
| JP | 5242837 B1 | | 7/2013 | |

OTHER PUBLICATIONS

English Abstract of JPS5528825, Publication Date: Feb. 29, 1980.
English Abstract of JP5242837, Publication Date: Jul. 24, 2013.

* cited by examiner

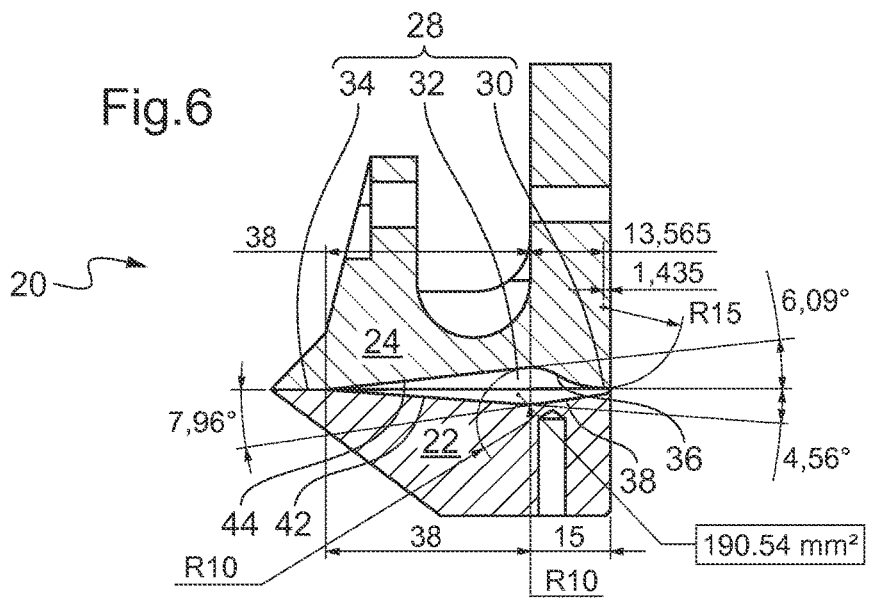
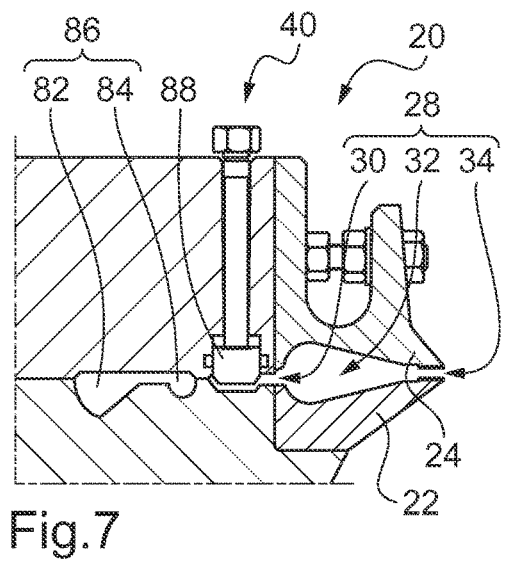
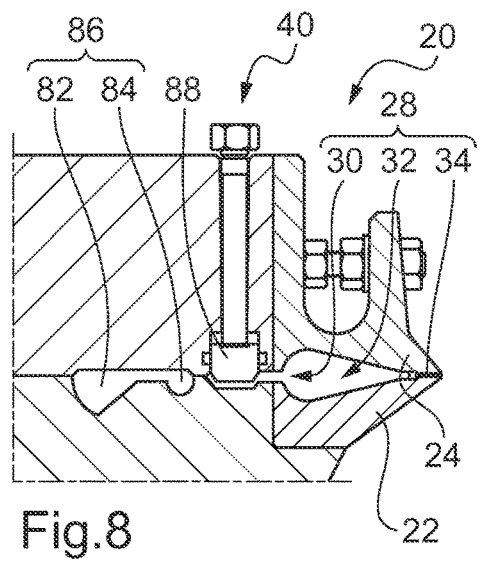
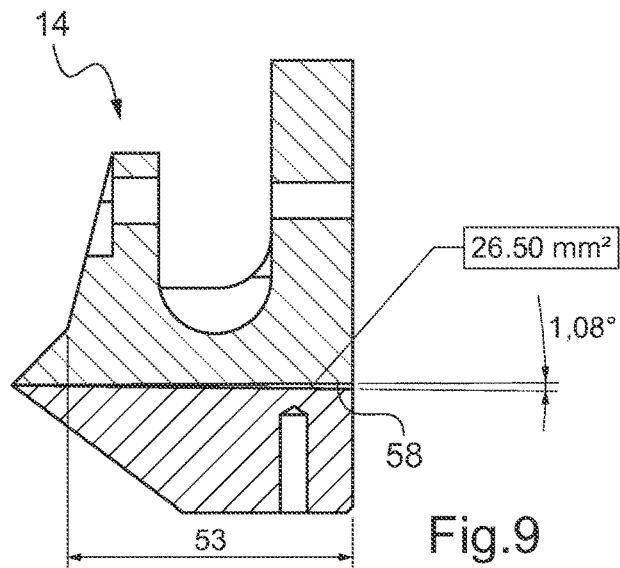

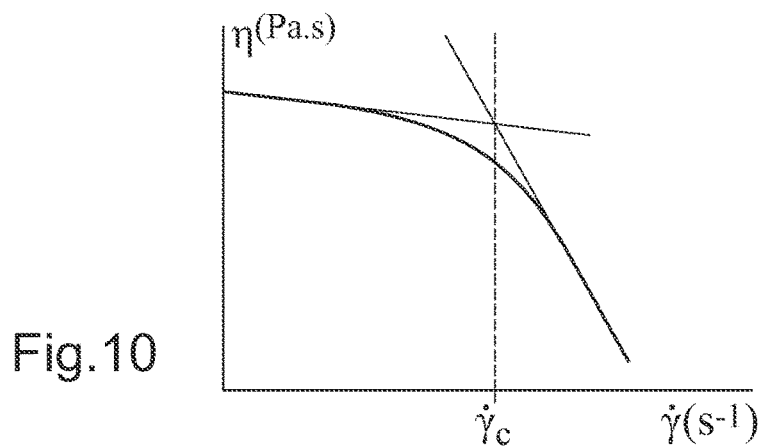
Fig.10
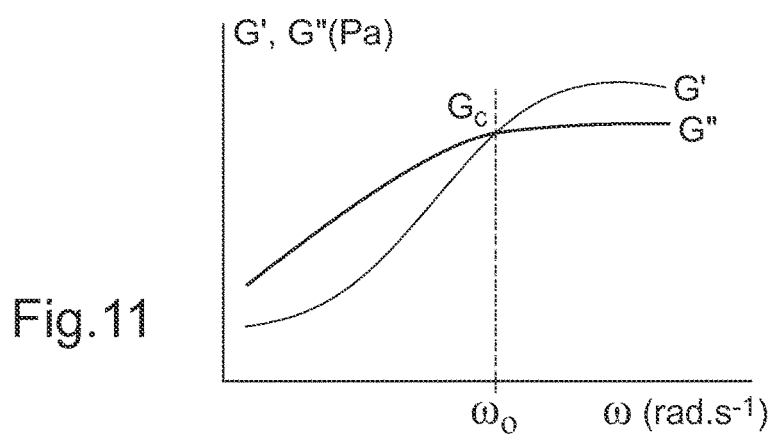
Fig.11
Fig.12
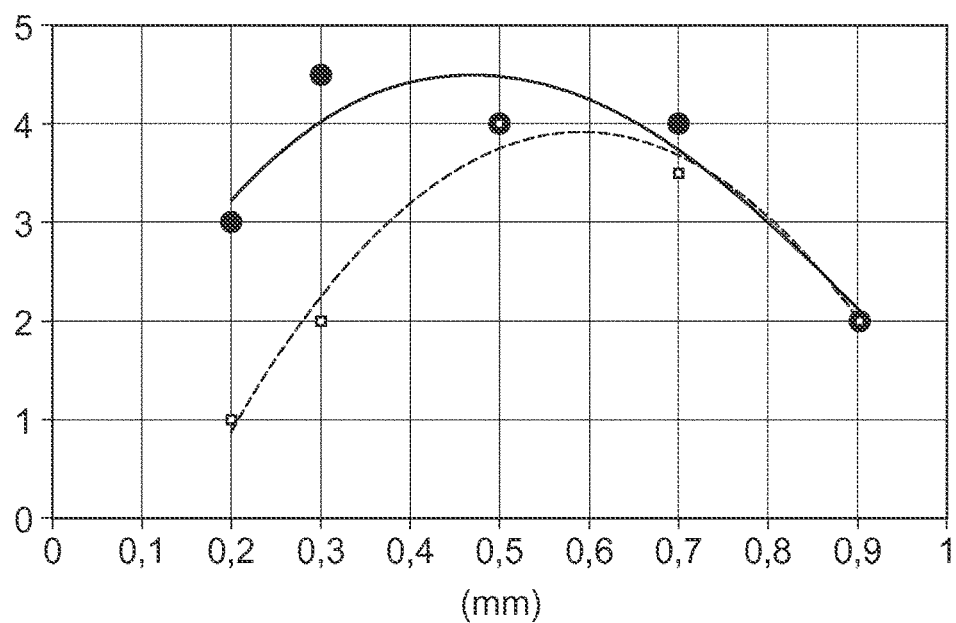

CONTINUOUS GLUING PROCESS OF AN ADHESIVE COMPOSITION WITH A GLUING NOZZLE HAVING AN EXTRUSION DIE WITH A RELAXATION VOLUME

The invention relates to a gluing process for the continuous gluing of a substrate film, the gluing process using a gluing nozzle with an extrusion die for continuous extrusion of an adhesive composition into film.

Flexible packaging, in particular flexible packaging made by the agri food, cosmetics or detergent industries, generally consist of several thin layers or substrates (in the form of sheets or films). These layers of substrate may be of different materials such as paper, aluminium or thermoplastic polymers such as polyethylene (or PE), polypropylene (or PP), whether or not oriented, copolymers of ethylene and vinyl acetate (EVA). These various different substrate layers of the flexible packaging are glued together to each other with a layer of an adhesive composition such as a composition based on a styrene block copolymer, so as to form a total thickness of between 5 and 150 µm. The various layers of material that make up the multilayer film are thus combined or assembled by means of laminating during a manufacturing operation known as complexing (as per the English terminology also known as "lamination") wherein use is made of adhesives and devices and machinery designed for this purpose. The resulting multilayer film thus obtained itself is often descriptively qualified by the terms complex or composite (or by the term "laminate").

Laminating adhesives in industrial practice may sometimes be present in the form of aqueous adhesives (for example adhesive types like casein or acrylic) but are very generally types of adhesive compositions like polyurethane. These latter types of adhesives are used in operations by industrial enterprises specialising in lamination (often referred to as laminators) in machines that operate on a continuous basis with line speeds that are generally high and in which both the films constituting the individual layers as well as the final complex film are, on account of their very wide dimensions, packaged by means of winding in the form of large reels whereof the width (or web) may extend up to about 2 m and with the diameter going up to 1.80 m.

The laminating processes generally used in industrial operations with polyurethane type adhesives include first of all a step of coating or gluing of the adhesive on to a first film of material, which consists of the depositing over the entire surface of a continuous adhesive layer of controlled thickness, corresponding to a quantity of adhesive glue (or spread) that is also controlled. This step of coating is followed by a step of glue laminating, or calendering, of a second film of material, that is identical to or different from the first, consisting of the application under pressure of this second film on to the first film covered with the layer of adhesive.

During the step of gluing of the film of material, it is a known technique to resort to extrusion of an adhesive composition for the process of gluing on to the film being run on a continuous basis. FIG. 1 shows a side view of a known continuous gluing system 50. The adhesive composition is extruded by an gluing nozzle 52 prior to being deposited on to the film of material 90 serving as a substrate and being run in the proximity of the gluing nozzle 52, in the direction of arrows 92. The gluing is said to be continuous since the film of substrate to be glued 90 is continuously glued as the substrate film is being run and on to the entire width of the film. After the gluing process, the glued film of substrate obtained 96 is laminated with the second film of material (not illustrated).

For the step of gluing, the adhesive composition gets output from an extrusion die 54 of the gluing nozzle 52. FIG. 2 shows an enlarged view of FIG. 1 that focuses on the extrusion die 54, and on the gluing zone of the substrate film 90. Between the extrusion die 54 and the substrate film 90, the extruded adhesive composition 62 is subjected to a draw ratio. The draw ratio is defined as the ratio between the running—drawing speed of the substrate film 90, visually represented by the arrows 92, and the speed of the adhesive composition 60 being output at the outlet of the gluing nozzle, with the speed being visually represented by the arrow 64. This draw ratio results in the adhesive composition adhesive 62 being subjected to high shearing.

The adhesive composition may also be subjected to high shearing during extrusion within the gluing nozzle 52. FIG. 3 shows a transverse cross sectional view of the gluing nozzle 52. The plane represented in FIG. 3 is thus a plane for which the normal is the direction of width of the gluing nozzle 52, that is to say, the transverse direction. FIG. 4 shows a top cross sectional view of the gluing nozzle 52 that focuses on the flow channel for the adhesive composition 60 in the gluing nozzle 52. The adhesive composition 60 is provided so as to flow along the direction of the arrow 64. The adhesive composition 60 flows from a supply opening 80 of the gluing nozzle 52 to a zone of distribution, or dispensation 86, of the supply flow of the adhesive composition 60 over the width of the gluing nozzle. The distribution zone 86 is divided into a first portion 82 and a second portion 84, visible in FIG. 3. A restrictor bar 88 is disposed downstream of the distribution zone 86 in order to enable a smoothing out of the flow velocity front of the adhesive composition after the distribution thereof. This restrictor bar 88 induces a strong shear in the adhesive composition 60. FIG. 5 shows a graph representing the shear rate during the flow of the adhesive composition 60 in the gluing nozzle 52. The portions 82, 84, 88 and 56 correspond to the parts of the gluing nozzle previously shown in FIG. 3. In particular, the portion 56 corresponds to the extrusion of the adhesive composition at the die 54 level. Thus in addition to the shearing induced by the restrictor bar 88, the extrusion die 54 may include, formed between the lips of the die, a channel 58 whose cross section is reduced towards the extrusion end, thus inducing additional shearing of the adhesive composition, as illustrated in FIG. 5.

Thus the adhesive composition 60 with which the substrate film is glued may be subjected to high shearing both during the extrusion in the gluing nozzle 52 as well as at the time of output at the outlet of the gluing nozzle 52. However, the adhesive composition 60 may be sensitive to shearing while having a rheofluidifying or shear thinning nature. In other words, the cohesiveness of the adhesive composition may decrease significantly with the shear gradient. Thus for pressure sensitive thermofusible adhesives (as per the English terminology also known as hot-melt pressure sensitive adhesive, abbreviated as HMPSA), the modulus of cohesion drops by one to several decades to give a shear rate beyond 400 to 800 $sec^{-1}$. With the cohesion of the adhesive composition falling, this cohesion may not be enough to maintain the homogeneity of the flow of the extruded adhesive composition 62 between the gluing nozzle 52 and the substrate film to be glued 90. The flow of adhesive composition may then present certain instabilities of a nature so as to degrade the appearance of the gluing or even cause tears, which are then found on the glued substrate 96.

These instabilities and the tears in the coating of adhesive composition on the glued substrate 96 increases with the decrease in the thickness of the layer of glued adhesive composition, and with the increase in speed of the gluing process. In other words, these instabilities and these tears or rips limit the speed of the gluing process and the fineness of the gluing. In particular the fineness of the gluing may be limited to 5 g/m², and the speed of gluing may be limited 200 m/min.

There is therefore a need to provide for improvements in terms of speed of gluing or fineness of the gluing.

More particularly, the invention aims to increase the cohesion of the adhesive composition to be glued.

To this end, the present invention provides a continuous gluing process for continuous gluing of a film of substrate by making use of a gluing nozzle comprising an extrusion die for extrusion of an adhesive composition over a predetermined width, the extrusion die comprising a lower lip and an upper lip, the upper and lower lips extending parallel to one another so as to form a transverse channel for the longitudinal flow of the adhesive composition, the transverse channel extending longitudinally between:
 a supply opening for supplying the adhesive composition; and
 an extrusion outlet for extrusion of the adhesive composition;
the channel comprising a concave volume for relaxation of the adhesive composition between the supply opening and the gluing outlet; and the process comprising:
 the provision of a supply of an adhesive composition to the gluing nozzle or the gluing system with a flow rate, the adhesive composition having a viscous behaviour with a relaxation time period;
 the extrusion of the adhesive composition by making use of the gluing nozzle, the relaxation volume of the die of the gluing nozzle being greater than the product of the relaxation time period and the flow rate of the supply of the adhesive composition.

According to preferred embodiments, the invention includes one or more of the following characteristic features:
 the upper and lower lips of the extrusion die extend parallel to one another with an adjustable spacing distance;
 at the minimum spacing of the extrusion die,
  the extrusion outlet is closed, and
  the average thickness of the relaxation volume is greater than 0.75 mm, preferably greater than 1.5 mm;
 the internal surfaces within the channel of the lower and upper lips of the extrusion die being chromium plated;
 the transverse cross section of the concave relaxation volume of the extrusion die presents:
  a maximum thickness;
  upstream of the maximum thickness, a boundary curve with the upper lip and a boundary curve with the lower lip, both of which have radius of curvature greater than or equal to 50 mm;
  downstream of the maximum thickness, a boundary curve with the upper lip and a boundary curve with the lower lip, both of which are straight with a transition radius for connecting to the maximum thickness that is greater than or equal to 50 mm.
 wherein the transverse cross section of the concave relaxation volume of the extrusion die has a drop like shape with a semicircular portion oriented towards the supply opening and a triangular portion whose most acute apex is oriented towards the extrusion outlet;

the gluing nozzle for the continuous gluing of an adhesive composition as a film having a predetermined width, the coating nozzle comprising:
 a supply opening for supplying the adhesive composition;
 a distribution zone for distributing the flow of adhesive composition from the supply opening across the width of the gluing nozzle;
 a restrictor bar for uniformly smoothing out the flow velocity front of the adhesive composition, over the width of the gluing nozzle, after the distribution zone,
the extrusion die, being arranged after the restrictor bar.—
 the gluing nozzle, within a gluing system for gluing an adhesive composition, comprising:
  provision of a supply of adhesive composition;
  the gluing nozzle mentioned previously and connected to the adhesive composition supply feed;
  a film running path of a substrate film to be glued with the gluing nozzle without contact.
 the gluing system further comprising a vacuum box in order to generate a depression between the gluing nozzle and the film running path of the substrate film.

Other characteristic features and advantages of the invention will become apparent upon reading the description that follows of embodiments of the invention, given purely by way of example and with reference made to the accompanying drawings.

BRIEF DESCRIPTION OF DRAWINGS

FIG. 6 shows a transverse cross sectional view, represented in millimetres, of an embodiment of the die of the proposed process.

FIG. 7 shows a gluing nozzle comprising an embodiment of the extrusion die of the proposed process.

FIG. 8 shows the die illustrated in FIG. 7 in position with spacing distance setting adjusted to a minimum.

FIG. 9 shows a transverse cross sectional view, represented in millimetres, of the known extrusion die of the system shown in FIG. 1.

FIG. 10 shows a graph representing the viscosity of an adhesive composition as a function of shear rate on a logarithmic scale.

FIG. 11 shows a graph representing the modulus of viscosity and the modulus of elasticity of an adhesive composition as a function of shear frequency over a logarithmic scale.

FIG. 12 shows a graph representing the appearance quality of the coating as a function of spacing distance value of the extrusion dies shown in FIGS. 6 and 9.

Figure 1:
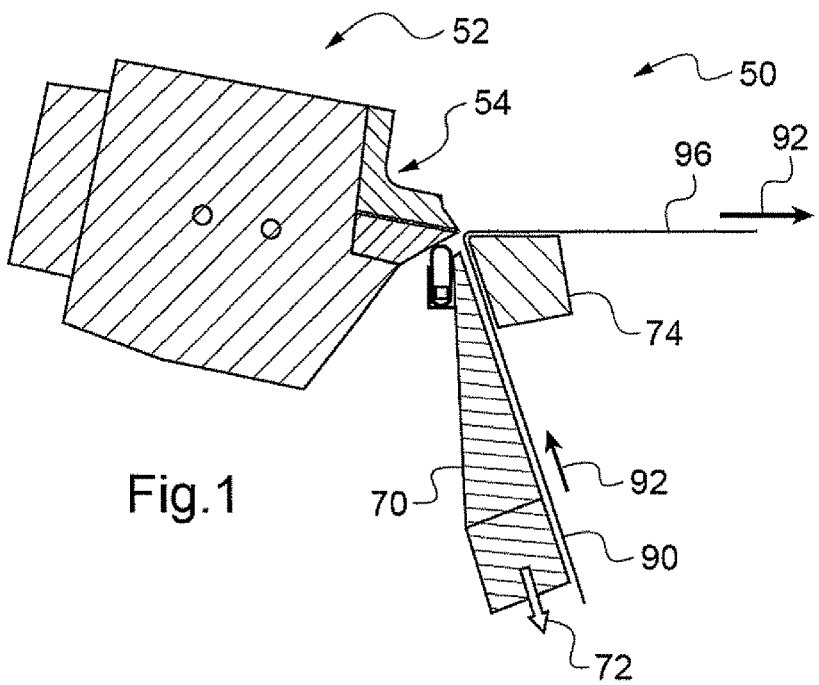
FIG. 1 shows a side view of a known continuous gluing system with a gluing nozzle provided with an extrusion die.

The invention provides a gluing process with a gluing nozzle having an extrusion die for an adhesive composition. The proposed process enables the continuous extrusion over a specified predetermined width of the adhesive composition. The direction of extrusion of the adhesive composition corresponds to a direction of the extrusion die said to be longitudinal and the width of the extruded adhesive composition extends in a direction of the die said to be transverse.

FIG. 6 shows a transverse cross sectional view, represented in millimetres, of an embodiment of the die 20. The plane represented in FIG. 6 is thus a plane for which the normal is the direction of width of the extrusion die, that is to say, the transverse direction. In a manner analogous to the known extrusion die 54 previously illustrated with the gluing nozzle 52 shown in FIGS. 1 to 4, the extrusion of the adhesive composition at the outlet of the die 20 of the proposed process enables the continuous gluing of a film of substrate. In other words, the extrusion die is a die of the gluing nozzle. The extrusion die 20 can thus be integrated in the gluing nozzle 52 previously illustrated in FIGS. 1 to 4, instead of the previously mentioned extrusion die 54 in order to form a gluing nozzle. FIG. 7 shows such a gluing nozzle 40 comprising the extrusion die 20 according to one embodiment.

The extrusion die used in the proposed process comprises a lower lip 22 and an upper lip 24. These lips 22 and 24 extend parallel to each other in the direction of extrusion of the die, that is, the longitudinal direction of the die. By extending parallel to one another, the lips 22 and 24 form, between them, a flow channel 28 for the adhesive composition between the lips 22 and 24. The die 20 of the proposed process makes possible the extrusion over the entire width of the die, the flow channel 28 extends mainly in a transverse direction of the die.

Furthermore, this transverse channel 28 also extends longitudinally so as to allow the flow of the adhesive composition in the direction of extrusion. Thus the transverse channel 28 extends longitudinally between a supply opening 30 for supplying adhesive composition, located on the right side in FIG. 6, and an extrusion outlet 34 for extrusion of the adhesive composition. According to the embodiments illustrated in FIGS. 6 and 7, the lips 22 and 24 extend parallel to each other with an adjustable spacing distance. In the position illustrated in FIG. 6, the spacing distance between the lips 22 and 24 having been set to the minimum, the extrusion outlet 34 is closed. With reference to FIG. 7, the embodiment of the die 20 is illustrated with the lips 22 and 24 in the separated position, the extrusion outlet 34 thus being open. FIG. 8 shows the die 20 as in FIG. 7 in position with a minimum spacing distance setting, that is to say the extrusion outlet is closed 34.

The transverse channel 28 comprises, between the supply opening 30 and the extrusion outlet 34, a concave volume 32. This concave volume 32 is to be compared with the volume of the channel 58 formed between the lips of the extrusion die 54 known and illustrated in FIG. 3. FIG. 9 shows a transverse cross sectional view, represented in millimetres, of the known extrusion die 54. According to this FIG. 9, for a length of 53 mm and an angle of reduction of the channel of 1.08°, the transverse cross section of the channel 58 is equal to 26.50 mm². The concave volume 32 comprised in the extrusion die 20 has a far greater cross section of 190.54 mm², thereby allowing for the relaxation of the adhesive composition downstream of the high shear induced by the restrictor bar 88 of the gluing nozzles 40 and 52. This volume 32 for relaxation allows the adhesive composition to regain good cohesiveness prior to the extrusion thereof at the extrusion outlet 34 and the gluing on the substrate film 90 to be glued. This regaining of good cohesiveness provides for the adhesive composition to further exhibit a greater degree of cohesion after the extrusion thereof through the die 20.

The greater cohesion allows for the gluing of a substrate film without instability or tearing of the coated adhesive composition, with greater speed of gluing and improved fineness of the gluing. Indeed, the gluing nozzle comprising the die can be incorporated instead of a known gluing nozzle 52 in a gluing system similar to the system 50 illustrated in FIG. 1. Such an improved gluing system enhanced with the gluing nozzle 40 is provided and includes in a manner analogous to the system 50 shown in FIG. 1, a film running path of substrate 90 to be glued. With reference to FIG. 2, the film running path of the substrate film may include a pneumatic cushion 74 generating a volume of pressurised air 76 in order to limit the friction of the substrate film 90 during the change in running direction at the level of the gluing nozzle.

This system comprising the die 20 with the relaxation volume 32 makes it possible to achieve gluing speeds that are greater than or equal to 300 m/min, such as 350 m/min, 400 m/min or even 600 m/min, and for gluing weights (grammage), less than or equal to 5 g/m², as 2 g/m². Following the gluing of the substrate, the glued substrate 96 may be glue laminated with a second film of material (step not illustrated) in order to form a flexible package, as previously described above.

Finally, the die, the gluing nozzle, the gluing system and the proposed gluing process provide for achieving improvements in terms of gluing speed as well as the fineness of the gluing, by providing the possibility of increasing the cohesiveness of the extruded adhesive composition.

Figure 2:
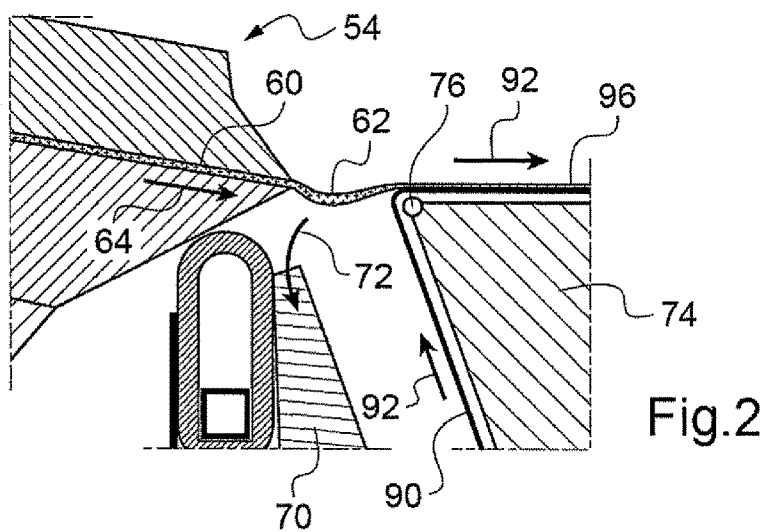
FIG. 2 shows an enlarged view of FIG. 1, that focuses on the extrusion die.
Figure 4:
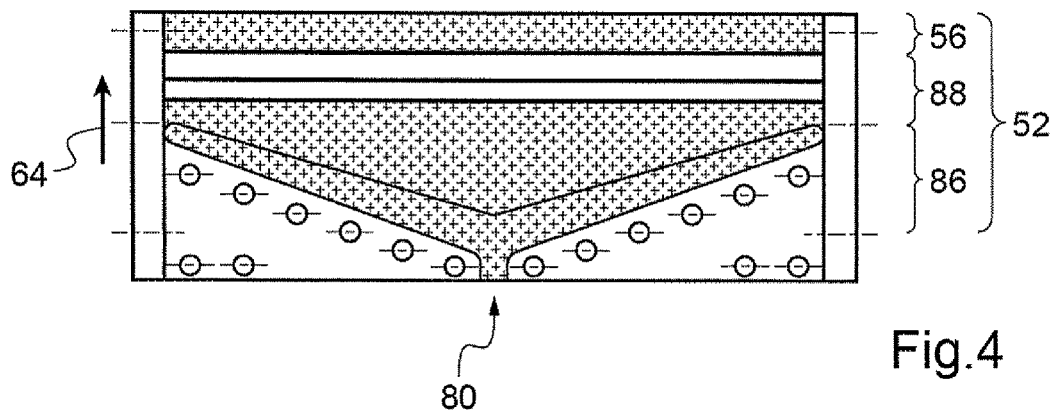
FIG. 4 shows a top cross sectional view of the gluing nozzle represented in FIG. 1.
Figure 3:
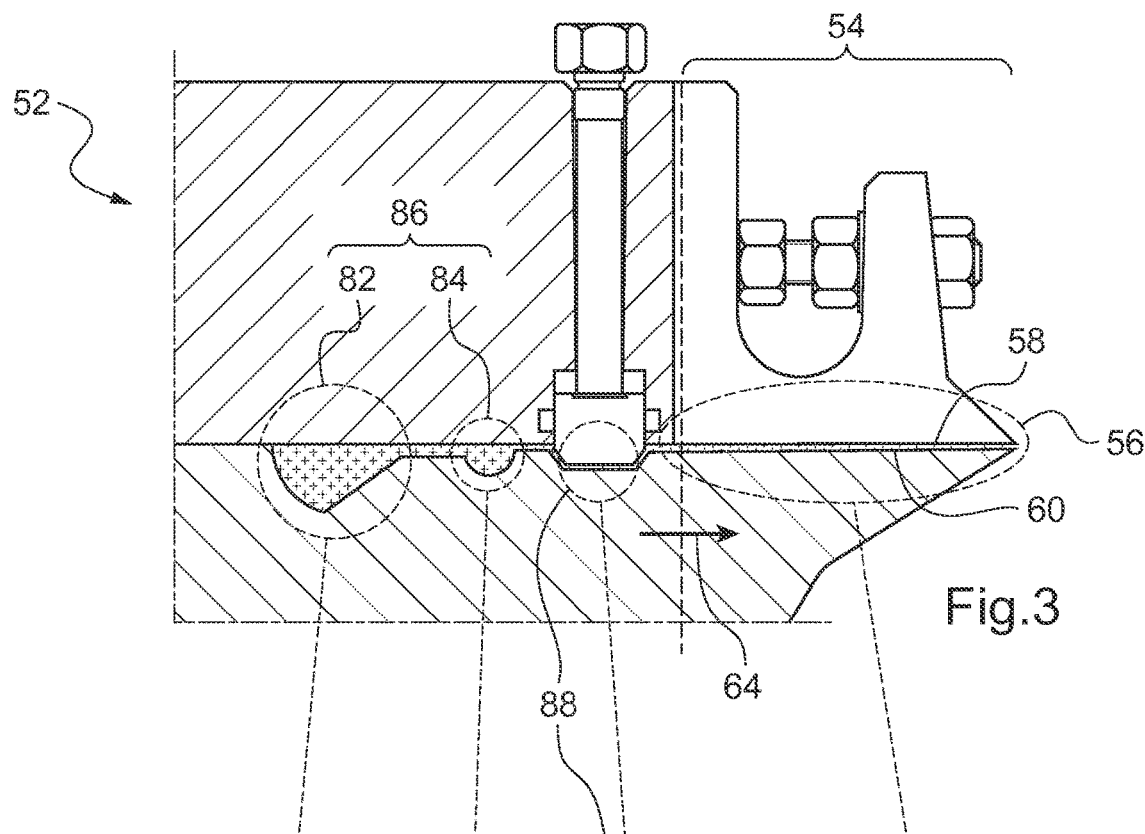
FIG. 3 shows a transverse cross sectional view of the gluing nozzle represented in FIG. 1.
Figure 5:
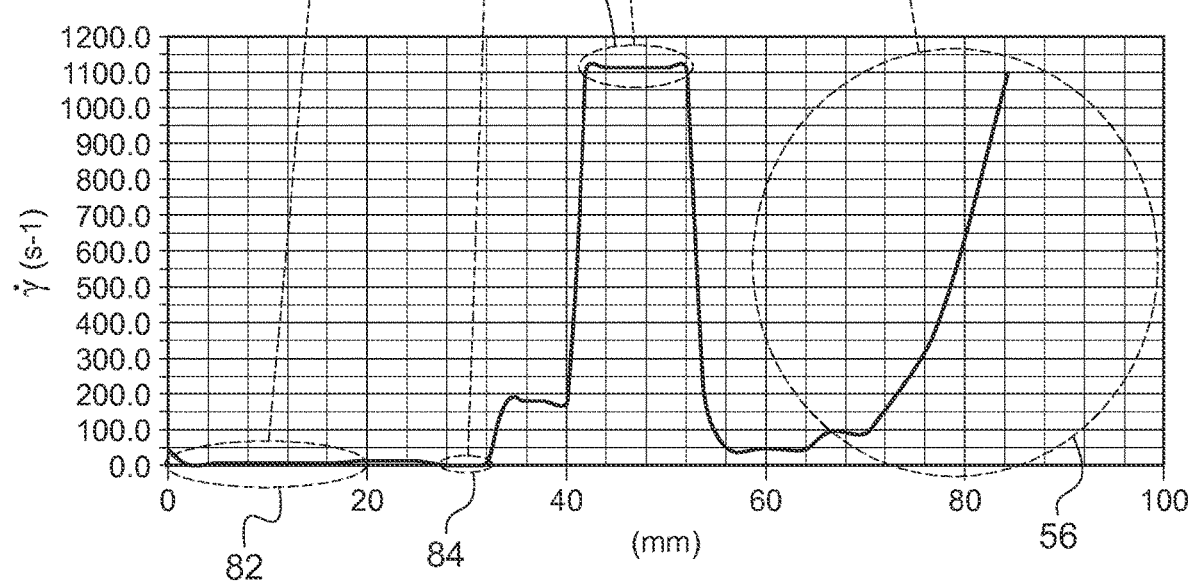
FIG. 5 shows a graph representing the shear rate during the flow of the adhesive composition in the gluing nozzle represented in FIG. 1.

The increase in the cohesiveness of the extruded adhesive composition is particularly advantageous for the substrate gluing system when the coating of the substrate film is carried out without contact, such as for the system 50 illustrated in FIG. 1.

On the one hand, with reference to the FIGS. 1 and 2, the contactless gluing system 50 may include a vacuum box 70 to be used for the extraction of air 72 from the extruded adhesive composition. This extraction of air 72 provides the ability to generate a depression counteracting the venturi effect, that is to say, the depression induced by the speed of the adhesive composition which limits the incorporation of air in the adhesive composition to be glued on to the film of substrate. The increase in the cohesiveness of the extruded adhesive composition then enables the extruded adhesive composition to withstand this additional depression from the vacuum box without resulting in instability or tearing.

On the other hand, the contactless gluing assumes a distance between the gluing nozzle 40 and the substrate 90, in the order of 1 mm. This relatively large distance in comparison to the thickness of the gluing induces an increased risk of tearing of the adhesive composition between the gluing nozzle 40 and the substrate 90. The greater cohesiveness of the extruded adhesive composition thus makes it possible to limit such a risk.

The gain in cohesiveness made possible by the relaxation volume of the die of the proposed process is related to the period of time or residence time that the adhesive composition remains at low levels of shears. FIG. 10 shows a graph representing the viscosity $\eta$ of the adhesive composition to be extruded as a function of the shear rate $\dot{\gamma}$ in logarithmic scale. This graph shows the drop in cohesiveness of the adhesive composition with the increase in the shear. The viscosity curve has two asymptotes, one on the left, and one on the right of the graph, intersecting in an abscissa (horizontal axis) point $\dot{\gamma}_C$. The viscous behaviour of the adhesive composition may then be modeled in a simplified manner as having a high degree of cohesiveness below $\dot{\gamma}_C$ and a low degree of cohesiveness above $\dot{\gamma}_C$. $\dot{\gamma}_C$ thus corresponds to the inverse of a time period of relaxation $\lambda_C$ characteristic of the residence time required for the adhesive composition to regain a high degree of cohesiveness. The relaxation volume 32 in the extrusion die of the proposed process provides the ability to increase the residence time of the adhesive composition between the passage through the restrictor bar 88 and the extrusion at the outlet of the die. This residence time of the adhesive composition may thus exceed the relaxation time $\lambda_C$ in a manner such that the adhesive composition regains a high degree of cohesiveness before the extrusion.

Based on an alternative to the determination of the relaxation time with the aid of FIG. 10, the relaxation time may be determined by making use of the complex shear modulus $G^*$ of the adhesive composition. FIG. 11 shows a graph representing the viscous modulus G' (also known as the storage modulus) and the elastic modulus G" (also known as the loss modulus) of the adhesive composition as a function of the shear frequency ω on a logarithmic scale. The viscous modulus G' and the elastic modulus G" respectively correspond to the real part and the imaginary part of the complex shear modulus $G^*$ of the adhesive composition in accordance with the following equation:

$$G^*(\omega)=G'(\omega)+iG''(\omega)$$

According to FIG. 11, the abscissa of the point of intersection of the storage modulus G' and the loss modulus G" corresponds then to a frequency $\omega_0$ characteristic of the viscous behaviour of the adhesive composition. The relaxation time $\lambda_C$ of the adhesive composition is then equal to the inverse of this characteristic frequency $\omega_0$.

The improvement of the cohesiveness of the adhesive composition to be glued may be obtained by using the proposed gluing process. According to this proposed process, the adhesive composition is supplied and then extruded by making use of the gluing nozzle. This supply and the extrusion exhibit a certain flow rate of the adhesive composition. The adhesive composition presents a characteristic relaxation time. The relaxation volume of the extrusion die included in the nozzle is then adapted to the relaxation time and the flow rate of the adhesive composition. In fact the time of residence of the adhesive composition in the extrusion die, as a result of the restrictor bar is equal to the ratio between the volume of the transverse channel 28 and the flow rate of the adhesive composition. The residence time is then greater than the relaxation time of the adhesive composition when the relaxation volume 28 is greater than the product of the relaxation time and the flow of the adhesive composition.

The relaxation volume 28 of transverse channel 32 may be characterised by its average thickness in the minimum spacing distance position, that is to say for which the extrusion outlet is closed 34. The average thickness of the relaxation volume may be greater than 0.75 mm, preferably greater than 1.5 mm, such as in FIG. 6, wherein the average thickness is equal to 3.6 mm. In comparison, for the known extrusion die illustrated in FIG. 9, the average thickness is equal to 0.5 mm.

Alternatively, the relaxation volume may be characterised by its maximum thickness in the position of minimum spacing distance of the lips 22 and 24. The maximum thickness of the relaxation volume may thus be greater than 1.5 mm, preferably greater than 3 mm, such as in FIG. 6 where the maximum thickness is equal to 7.5 mm.

The concave shaped form of the relaxation volume of the transverse channel 32 may be characterised by the transverse cross section of this volume. This transverse cross section corresponds to the surface visible in FIGS. 6 and 8 between the lips 22 and 24 in their minimum spacing distance position. In accordance with the embodiment illustrated in FIG. 8, this transverse cross section may be shaped like a drop. This drop like shape corresponds to the assembly of a semi circular part oriented towards the supply opening 30 and a triangular part 34 whose most acute apex is oriented towards the outlet. In accordance with the embodiments illustrated in FIGS. 6 and 8, the section may have a maximum thickness, upstream of this maximum thickness a periphery with a radius of curvature that is greater than or equal to 50 mm and downstream from this maximum thickness a periphery in the right portions with a transition radius for connecting to the maximum thickness that is greater than or equal to 50 mm. Thus upstream, the boundary curves of the transverse cross section with the upper lip and the lower lip, respectively 36 and 38, may both present radii of curvature greater than or equal to 50 mm. Similarly downstream, the boundary curves of the transverse cross section with the upper lip and the lower lip, respectively 44 and 42 may both be straight with a transition radius for connecting to the maximum thickness that is greater than or equal to 50 mm.

The relaxation volume 32 allowed by the extrusion die may be adapted with the adjustable spacing distance of the upper and lower lips as in the embodiments illustrated in FIGS. 6 to 8. The relaxation volume 32 is in effect equal to the volume of the transverse channel 28 in the position of minimum spacing distance added to the volume of spacing distance of the lips 22 and 24 of the die, which is the product between the spacing distance, the width of the die and the length of the die.

However, the increase in the spacing distance of the lips of the die leads also to an increase in the draw ratio, previously mentioned as being the ratio between the running—drawing speed of the substrate film to be glued 90 and the speed of the adhesive composition being output at the outlet of the gluing nozzle 40. Indeed, through/by means of the conservation of the flow rate during the gluing process, this draw rate is also equal to the ratio between the section of the outlet of the extrusion die 20 and the section of the adhesive composition deposited on the substrate film 90. However, the reduction of the width of the adhesive composition between the extrusion die 20 and the substrate film 90 (as per the English terminology this reduction is also referred to as "Neck-in") being low, the draw ratio depends strongly on the ratio between the spacing distance of the extrusion outlet of the die and the thickness of the glued adhesive composition. The thickness of the glued adhesive composition being imposed by the flow rate of the gluing process, the variation of the spacing distance of the extrusion outlet of the die 20 (as per the English terminology this variable value is also referred to as "Shim", abbreviated to S) directly and increasingly has an impact on the draw ratio.

The increase in the draw ratio results in an increase in the shear of the extruded adhesive composition prior to the gluing thereof. An extremely high increase in the shear then causes a very significant decrease in cohesion of the extruded adhesive composition. An excessive drop in the cohesion after the extrusion of the adhesive composition presents the risk of the occurrence of instabilities or tearing. There exists therefore an optimum spacing distance of the lips of the die between the positive effects for cohesion and the increase in the residence time of the adhesive composition as compared to its relaxation time and the negative effects for cohesion and the increase in the draw ratio.

FIG. 12 shows a graph representing the appearance quality of the coating as a function of spacing distance value, S, of the extrusion dies shown in FIGS. 6 and 9. The appearance quality is graded from 1 to 5, corresponding respectively to: a poor and inhomogeneous appearance, a poor and homogeneous appearance, an acceptable appearance, a good appearance, and a very good appearance. The solid dots and the solid curve correspond to the appearance quality of the coating making use of the die 20 shown in FIG. 6. The open squares and the dotted curve correspond to the appearance quality of the coating making use of the known die 14 shown in FIG. 9. These values have been obtained for the same adhesive composition hereinafter referred to as Example 1 with a production speed of 300 m/min and a grammage or weight of 3 g/m². The adhesive composition Example 1 consists of 40% of Kraton® D1113 and 60% of Escorez® 5400. Kraton® corresponds to a mixture available from the company Kraton of linear polymers comprising 56% of isoprene styrene diblock, 44% of isoprene styrene triblock copolymers with a total content of styrene units of 16%. Escorez® 5400 is a resin from the company Exxon Chemicals, obtained by polymerisation and then hydrogenation of a mixture of unsaturated aliphatic hydrocarbons having about 9 or 10 carbon atoms.

The two curves show an optimum for the opening S of the die. The positive influence of the relaxation volume on the appearance quality can be increased in two ways. On the one hand the quality of appearance of the coating is generally best for the die 20 of the proposed process as compared to the known die 14, in particular the optimum of appearance quality is higher for the die 20 of the proposed process. On the other hand, the value of the spacing distance in order to achieve the optimum of appearance quality is lower for the die 20 of the proposed process as compared to the known die 14. The die 20 of the proposed process therefore makes it possible to obtain a better appearance quality and this at a lower spacing distance of the lips of the die. Obtaining this better appearance quality at a lower spacing distance enables in particular the increase in the coating speed while also maintaining an appearance quality that is greater or equal to the appearance quality obtained with the known die 14.

The improvements in the appearance quality of the gluing may be obtained with a wide variety of adhesive compositions having relaxation times that are appropriate to the volume of the relaxation channel. The proposed gluing process may in particular be implemented with adhesive compositions having relaxation times of the order of one millisecond at the gluing temperature, such as the adhesive compositions based on styrene isoprene styrene. The gluing temperatures for example are comprised between 160° C. and 120° C. The following table shows the different relaxation times for various different adhesive compositions including the adhesive composition Example 1 and two other adhesive compositions, respectively referred to as Example 2 and Example 3.

The adhesive composition referred to as Example 2 is constituted of 40% of Kraton® D1113, 20% of Escorez® 5400, 30% of Dertopoline® P125 and 10% of Nyflex 222B. Dertopoline® P125 is a polymerised rosin ester with pentaerythritol and available from the company DRT. Nyflex 222B corresponds to a plasticiser in the form of a paraffinic and naphthenic oil containing aromatic compounds.

The adhesive composition referred to as Example 3 is constituted of 40% of Kraton® D1113, 10% of Sylvatact® RE12, 30% of Escorez® 2203 LC and 20% of Dertopoline® P125. Sylvatact® RE12 is a resin in the form of a rosin ester available from the company Arizona Chemicals. Escorez® LC 2203 is a modified aliphatic hydrocarbon resin having about 9 or 10 carbon atoms and available from the company Exxon Chemicals.

TABLE relaxation times of the adhesive compositions according to the gluing temperature

| References | Temperature | | | |
|---|---|---|---|---|
| | 160° C. | 140° C. | 120° C. | 100° C. |
| Example 1 | 0.102 ms | 0.410 ms | 5.600 ms | 270.000 ms |
| Example 2 | 0.198 ms | 0.150 ms | 0.730 ms | 15.000 ms |
| Example 3 | 0.816 ms | 0.490 ms | 3.000 ms | 47.000 ms |

The gluing temperatures 160° C., 140° C. and 120° C. make it possible to obtain relaxation times for the adhesive compositions Examples 1 to 3 which are lower than the residence time made possible by the relaxation volume of the die of the proposed process. These adhesive compositions may thus be glued to the substrate film 90 according to the proposed process at temperatures of 160° C. to 120° C. In a general manner, the proposed process enables the gluing of adhesive composition presenting relaxation times of 0.1 to 2.0 msec at the gluing temperature.

Quite obviously, the present invention is not limited to the examples and embodiments described and represented, but is capable of lending itself to numerous variants. In particular, the examples of the preceding adhesive compositions are based on styrene isoprene styrene copolymer, but the extrusion die, the nozzle and the coating system and the coating process may be implemented for any other adhesive composition that is sensitive to shearing, in other words for any other adhesive compositions having a rheofluidifying or shear thinning character. The upper and lower lips 24 and 22 may in particular have surfaces internal to the channel 32 that are polished or chromium plated or even polished and chromium plated. The chromium plating, as well as the polishing, which provide the ability, together or separately, by means of the reduction of the surface roughness to limit the friction and reduce the shearing of the adhesive composition during extrusion through the die and thus to limit the reduction in the cohesiveness of the adhesive composition.

The invention claimed is:

1. A continuous gluing process for continuous gluing of a film of substrate by making use of a gluing nozzle comprising an extrusion die for extrusion of an adhesive composition over a predetermined width, the extrusion die comprising a lower lip and an upper lip, the upper and lower lips extending parallel to one another so as to form a transverse channel for the longitudinal flow of the adhesive composition, the transverse channel extending longitudinally between:
   a supply opening for supplying the adhesive composition; and
   an extrusion outlet for extrusion of the adhesive composition;
   the channel comprising a concave relaxation volume of the adhesive composition between the supply opening and the extrusion outlet; and
the process comprising:
   supplying an adhesive composition to the gluing nozzle with a flow rate, the adhesive composition having a viscous behaviour with a relaxation time period;

adapting the relaxation volume of the die of the gluing nozzle to the relaxation time period and the flow rate of the supply of the adhesive composition, so that the relaxation volume of the die of the gluing nozzle is greater than the product of the relaxation time period and the flow rate of the supply of the adhesive composition;

extruding the adhesive composition by making use of the gluing nozzle.

2. A gluing process according to claim 1, wherein the upper and lower lips of the extrusion die extend parallel to one another with an adjustable spacing distance.

3. A gluing process according to claim 2, wherein at the minimum spacing distance of the extrusion die,
the extrusion outlet is closed, and
the average thickness of the relaxation volume is greater than 0.75 mm.

4. A gluing process according to claim 1, with the internal surfaces within the channel of the lower and upper lips of the extrusion die being chromium plated.

5. A gluing process according to claim 1, wherein the transverse cross section of the concave relaxation volume of the extrusion die presents:
a maximum thickness;
upstream of the maximum thickness, a boundary curve with the upper lip and a boundary curve with the lower lip, both of which have radius of curvature greater than or equal to 50 mm;
downstream of the maximum thickness, a boundary curve with the upper lip and a boundary curve with the lower lip, both of which are straight with a transition radius for connecting to the maximum thickness that is greater than or equal to 50 mm.

6. A gluing process according to claim 1, wherein the transverse cross section of the concave relaxation volume of the extrusion die has a drop like shape with a semicircular portion oriented towards the supply opening and a triangular portion whose most acute apex is oriented toward the extrusion outlet.

7. A gluing process according to claim 1, wherein the gluing nozzle for the continuous gluing of an adhesive composition as a film has a predetermined width, the gluing nozzle comprising:
a supply opening for supplying the adhesive composition;
a distribution zone for distributing the flow of adhesive composition from the supply opening across the width of the gluing nozzle;
a restrictor bar for uniformly smoothing out the flow velocity front of the adhesive composition, over the width of the gluing nozzle after the distribution zone, and
the extrusion die being arranged after the restrictor bar.

8. A gluing process according to claim 1, wherein the gluing nozzle is within a system for gluing an adhesive composition that is connected to a supply of adhesive composition; the gluing system also comprising a film running path of a substrate film to be glued with the gluing nozzle without contact between the gluing nozzle and the substrate film.

9. A gluing process according to claim 8, wherein the gluing system further comprises:
a vacuum box in order to generate a depression between the gluing nozzle and the running path of the substrate film.

10. A gluing process according to claim 3, with the internal surfaces within the channel of the lower and upper lips of the extrusion die being chromium plated.

11. A gluing process according to claim 10, wherein the transverse cross section of the concave relaxation volume of the extrusion die presents:
a maximum thickness;
upstream of the maximum thickness, a boundary curve with the upper lip and a boundary curve with the lower lip, both of which have radius of curvature greater than or equal to 50 mm; and
downstream of the maximum thickness, a boundary curve with the upper lip and a boundary curve with the lower lip, both of which are straight with a transition radius for connecting to the maximum thickness that is greater than or equal to 50 mm.

12. A gluing process according to claim 11, wherein the transverse cross section of the concave relaxation volume of the extrusion die has a drop like shape with a semicircular portion oriented towards the supply opening and a triangular portion whose most acute apex is oriented toward the extrusion outlet.

13. A gluing process according to claim 12, wherein the gluing nozzle is within a system for gluing an adhesive composition that is connected to a supply of adhesive composition; the gluing system also comprising a film running path of a substrate film to be glued with the gluing nozzle without contact between the gluing nozzle and the substrate film.

14. A gluing process according to claim 3, wherein the transverse cross section of the concave relaxation volume of the extrusion die presents:
a maximum thickness;
upstream of the maximum thickness, a boundary curve with the upper lip and a boundary curve with the lower lip, both of which have radius of curvature greater than or equal to 50 mm; and
downstream of the maximum thickness, a boundary curve with the upper lip and a boundary curve with the lower lip, both of which are straight with a transition radius for connecting to the maximum thickness that is greater than or equal to 50 mm.

15. A gluing process according to claim 14, wherein the transverse cross section of the concave relaxation volume of the extrusion die has a drop like shape with a semicircular portion oriented towards the supply opening and a triangular portion whose most acute apex is oriented toward the extrusion outlet.

16. A gluing process according to claim 15, wherein the gluing nozzle is within a system for gluing an adhesive composition that is connected to a supply of adhesive composition; the gluing system also comprising a film running path of a substrate film to be glued with the gluing nozzle without contact between the gluing nozzle and the substrate film.

17. A gluing process according to claim 3, wherein the transverse cross section of the concave relaxation volume of the extrusion die has a drop like shape with a semicircular portion oriented towards the supply opening and a triangular portion whose most acute apex is oriented toward the extrusion outlet.

18. A gluing process according to claim 17, wherein the gluing nozzle is within a system for gluing an adhesive composition that is connected to a supply of adhesive composition; the gluing system also comprising a film running path of a substrate film to be glued with the gluing nozzle without contact between the gluing nozzle and the substrate film.

19. A gluing process according to claim 3, wherein the gluing nozzle is within a system for gluing an adhesive composition that is connected to a supply of adhesive composition; the gluing system also comprising a film running path of a substrate film to be glued with the gluing nozzle without contact between the gluing nozzle and the substrate film.

20. A gluing process according to claim 7, wherein the gluing nozzle is within a system for gluing an adhesive composition that is connected to a supply of adhesive composition; the gluing system also comprising a film running path of a substrate film to be glued with the gluing nozzle without contact between the gluing nozzle and the substrate film.

21. A gluing process according to claim 2, wherein at the minimum spacing distance of the extrusion die,
- the extrusion outlet is closed, and
- the average thickness of the relaxation volume is greater than 1.5 mm.

* * * * *